Nov. 11, 1924.
T. D. YENSEN
MEASURING DEVICE
Filed Oct. 23, 1920
1,515,237
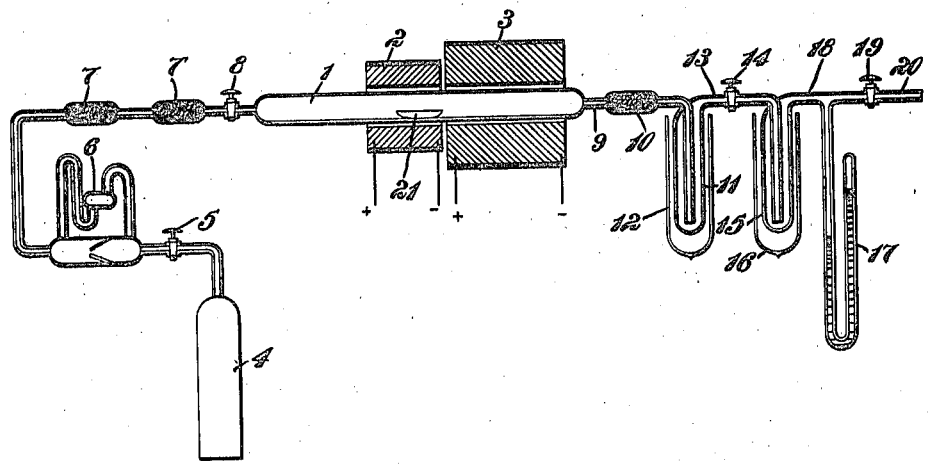
WITNESSES:
INVENTOR
Tryggve D. Yensen.
BY
Wesley G. Carr
ATTORNEY Patented Nov. 11, 1924.

1,515,237

UNITED STATES PATENT OFFICE.

TRYGVE D. YENSEN, OF EAST PITTSBURGH, PENNSYLVANIA, ASSIGNOR TO WESTINGHOUSE ELECTRIC & MANUFACTURING COMPANY, A CORPORATION OF PENNSYLVANIA.

MEASURING DEVICE.

Application filed October 23, 1920. Serial No. 419,086.

*To all whom it may concern:*

Be it known that I, TRYGVE D. YENSEN, a citizen of the United States, and a resident of East Pittsburgh, in the county of Allegheny and State of Pennsylvania, have invented a new and useful Improvement in Measuring Devices, of which the following is a specification.

This invention relates to the determination of the percentages of carbon in metals, such as iron, steel, and iron alloys; more especially, my invention relates to a method of and means for determining carbon percentages in small amounts to an accurate degree, it being among the objects of my invention to devise a method of determining the percentage of carbon, and an apparatus to be used in conjunction therewith which will be comparatively simple and accurate to a high degree.

In the investigation of the physical properties of iron and iron alloys I have found that carbon, even in minute quantities, influences their properties to a very large extent. Quantities that hitherto have been regarded as traces have been found to be sufficient to change certain properties, such as the permeability and the hysteresis loss of a magnetic steel, 100 or 200%. Furthermore, carbon may exist in iron in various forms, one or more which may influence the properties considerably, while others may have little or no influence upon these properties. The accurate determination of these small quantities and the separation of the different forms is, therefore, of great importance, and a large amount of work has been done with the object in view of developing suitable methods to accomplish this purpose.

Up to the present, the standard method has consisted in heating a sample, in the form of shavings or chips, in a gas-tight tube to a temperature of 800–1000° C., passing oxygen through the tube and absorbing the resulting $CO_2$ in a bulb containing KOH or the equivalent. The increase in weight of the KOH bulb gives the weight of $CO_2$. Precautions are taken, of course, so that presumably nothing but the $CO_2$ from the sample is absorbed by the KOH bulb. As ordinarily practiced, this method is satisfactory for carbon contents of 0.1% or more, and, if great care is exercised, the error should be within $\pm 0.01\%$.

The chief sources of error in this method are:—

1. Contamination of sample due to oil, grease, dust or dirt of any kind.
2. Dust or dirt or other carbonaceous matter in the combustion tube, in the sample holder, or in the connections between the tube and the rest of the apparatus.
3. Adsorbed CO or $CO_2$ in the walls of the combustion tube, or in the sample holder.
4. Admission of CO or $CO_2$ in opening the combustion tube.
5. Incomplete washing of the oxygen before it enters the combustion tube.
6. Incomplete oxidation of the carbon, resulting in some CO instead of all $CO_2$.
7. Incomplete absorption of $CO_2$ in the KOH bulb.
8. Weighing of the KOH bulb; moisture and dust collects on the bulb in uncertain amounts, and the weighing itself can at best be done with an accuracy of $\pm 0.1$ mg.
9. Carbon left in sample.

Some of these sources of error may be eliminated from this method by careful manipulation, thus:

(1) may largely be taken care of by careful sampling and boiling the sample in ether prior to placing it in the combustion boat.

(2) and (3) may be minimized by burning out the system, including the sample holder, with oxygen, prior to introducing the sample, while (5) may be eliminated by means of active KOH and soda-lime in the train, according to standard practice.

This leaves (4), (6), (7), (8) and (9) as sources of error that may not readily be eliminated when this method is used. The resulting errors vary to such an extent that it is difficult to get satisfactory blanks, and it is, therefore, necessary to make radical modifications.

A great deal of work has been done on the elimination of gases from metals, including iron and iron-silicon alloys, by heating the samples in vacuo and analyzing the gases given off. It was found that large quantities of CO and $CO_2$ were given off below 600° C., whereas additional CO and $CO_2$ were given off in varying amounts—depending upon the alloy—above this point.

Based on these results, it was concluded that the CO and $CO_2$ given off below 600° C. exist in the metal as absorbed gases while the gas given off above this temperature is due to chemical reaction between the combined or graphitic carbon in the metal and the iron oxide present.

It is quite probable that these different forms of carbon, i. e., that existing as absorbed gases and that existing as combined or graphitic carbon, have different effects upon the physical properties of the metal and it is, therefore, of great importance to differentiate between them. This differentiation is taken care of in the new method described below.

The single figure of the accompanying drawing illustrates, diagrammatically, an apparatus which I have found suitable for carrying out my new process.

The combustion tube 1, preferably made of silica, is of considerable length and has an electrically heated furnace 2 slidably mounted thereon which surrounds the tube 1 and is adapted to heat the tube to any desired degree,—about 600° C. A similar electric furnace 3, also slidably mounted on the tube, is adapted to heat the tube to a temperature higher than furnace 2,—about 1000° C. or even higher.

To one end of tube 1 is connected an oxygen supply tank 4 provided with a regulator 5 and a meter 6, by means of which the flow of oxygen into the combustion tube may be regulated and measured. A set of absorption bulbs 7 and 7' are connected into the line between the oxygen meter and the combustion tube, the bulb 7 being filled with soda-lime to absorb any carbon-dioxide in the oxygen and the bulb 7' being filled with phosphorus pent-oxide for the absorption of any water therefrom. A stop cock 8 is interposed between the absorption bulbs and the combustion tube.

To the outlet 9, at the opposite end of the combustion tube, is connected a tube 10 adapted to be electrically heated and which contains copper oxide for the oxidation of carbon monoxide to the dioxide. The outlet from the copper-oxide tube leads into a test tube or other receptacle 11 surrounded by a bath 12 of carbon-dioxide snow in order to provide sufficient cooling for the condensation of water vapor from the gases flowing from the furnace. In the outlet 13, from test tube 11, is interposed a cut-off 14 of any suitable construction, here shown, for convenience, as a stop cock. The tube 13 then leads into a test tube or other receptacle 15 which is surrounded by a Dewar flask 16, for instance, containing liquid air to condense the carbon dioxide in the gases from the furnace. A mercury manometer 17 is connected to the tube 18 leading from the test tube 15, and a cut-off 19, of suitable construction, is adapted to close off the tube 20 which leads to a vacuum pump or other suitable evacuating apparatus (not shown.) That part of the system included between stop cocks 14 and 19 is of a known volume which has been accurately calibrated.

A method of determining the percentage of carbon in a sample of steel is as follows:—

The sample is carefully collected to keep out foreign matter and the weighed portion then cleaned with ether. The ether is evaporated in an Erlenmeyer flask and the vapor passed through the sample held in a Gooch crucible. The condensed vapor again passes through the sample on its way from the condenser to the bottom of the flask and is reheated by the rising vapors. The sample is thus exposed to a constant stream of hot clean ether, carrying oily and greasy matter down into the bottom of the flask.

The sample is then placed on a layer of specially prepared alundum in an alundum combustion boat 21 that has previously been heated in the combustion tube 1 to 1000° in a stream of oxygen. The sample is also covered with a layer of alundum. This precaution should eliminate carbonaceous matter in the boat and in the combustion tube.

The combination boat 21 is now placed near the center of the tube 1 with the furnaces 2 and 3 moved over to one end thereof, and the tube is closed. With the boat at room temperature or slightly above, the tube is evacuated to a pressure of 0.01 mm. Hg. or less, eliminating all but traces of the free gases present in the system.

At the end of the above preliminary vacuum treatment, liquid air is placed on the trap 15 and the 600° furnace is moved over the sample in boat 21. The sample is treated at 600° in vacuum for 15 min. or more in order to remove the absorbed gases. The $CO_2$ is "frozen out" in the liquid air trap 15 and the amount determined by isolating the analyzing apparatus by closing stop cocks 14 and 19, removing the liquid air from trap 15, allowing the $CO_2$ to evaporate, and noting the increase in pressure on the manometer 17.

During the determination of the $CO_2$ the central portion of tube 1 is heated to 1000° C. by furnace 3 and oxygen is admitted to the combustion tube up to atmospheric pressure from the supply 4, regulator 5, and meter 6, through the soda-lime and phosphorus pentoxide bulbs 7 and 7' to wash it free from $H_2O$ and $CO_2$, the flow being regulated by means of the stop cock 8 and regulator 5. This filling of the combustion tube requires about 10 min.; by the end of this period the previous determination of the carbon dioxide removed at 600° C. has been completed and the combustion tube is evacuated through the $CO_2$- snow and liquid air traps 11 and 15. When the pressure reaches 0.01 mm. Hg., cut off 14 is closed, the system further evacuated to 0.001 mm. and the $CO_2$ analyzed as before, at the same time filling the combustion tube a second time with oxygen to make another analysis to make sure that all the carbon has been removed.

Complete combustion of the carbon is insured by passing the gases through CuO heated to 400° in tube 10. From the volume of the apparatus and the pressure the amount of carbon can then be calculated.

If there is any reason to believe that all the carbon has not been burnt during the previous combustion periods, the combustion process can be repeated any number of times until no further $CO_2$ is obtained. This can be done without introducing additional errors, which is not the case when the ordinary combustion method is used.

By the foregoing method and apparatus, I am enabled to determine, not only very minute percentages of carbon in various alloys, but also carbon contained in such alloys, which is in various conditions, such as in the form of occluded gases or in solid form combined with the metal. My apparatus is very accurate, easy to manipulate without the necessity of employing highly skilled analysts, and is comparatively cheap.

Although I have shown and described my apparatus and method as relating only to the determination of carbon in a low-carbon steel, it is of course obvious that my invention is not limited to the determination of carbon in steel since it is equally adapted to such determinations in various alloys, such as silicon steel. Relatively large percentages of carbon may also be accurately determined, but this apparatus is especially suitable when very small percentages are present.

Various changes in manipulation and apparatus may be made within the scope of my invention; for instance, instead of utilizing oxygen as the oxidizing agent, I may, in the case of refractory substances, such as silicon steel, dispense with oxygen and mix the sample in the combustion boat 21 with a very pure oxide of iron, preferably a higher oxide, such as the magnetic oxide; or I may use both oxide of iron and oxygen. Also, if a very high degree of accuracy in the determination of the pressure produced by the carbon-dioxide formed is desired, I may substitute mercury cut-offs for stop cocks 14 and 19 and I may use a McLeod gauge for the determination of very low pressures. Determinations of small percentages of carbon by the method above described may be made with an accuracy of +.0001% of carbon.

Although the above description is directed to the determination of percentages of carbon in metals and alloys, my invention is not limited thereto but other volatilizable constitutents which are contained in such metals, either as occluded gases, in solution, or in combination with the metals, may be determined as set forth above.

Having thus fully described my said invention, what I claim as new and desire to secure by Letters Patent is:—

1. A method of determining the percentage of carbon in a metal which comprises oxidizing a sample, condensing the gas formed, and quantitatively measuring the same.

2. A method of determining the percentage of carbon in a metal which comprises oxidizing a sample, condensing the gas formed by submitting same to a low temperature, and quantitatively measuring the same.

3. A method of determining the percentage of carbon in a metal which comprises oxidizing a sample, condensing the gas formed by liquid air, and quantitatively measuring the same.

4. A method of determining the percentage of carbon in a metal which comprises oxidizing a sample, condensing the gas formed under vacuum by means of liquid air, and quantitatively measuring the same.

5. A method of determining the percentage of carbon in a metal which comprises oxidizing a sample, condensing the gas formed by a low-boiling-point substance, removing said substance, allowing the liquefied gas to vaporize in a confined space, and measuring the pressure of said gas in said space.

6. A method of determining the percentage of carbon in a metal which comprises oxidizing a sample, condensing the gas formed by a low-boiling point substance, removing said substance, allowing the liquefied gas to vaporize in a confined space, and measuring the pressure of said gas in said space with the aid of a manometer.

7. A method of determining the percentage in carbon in a metal which comprises oxidizing a sample, removing water from the gas so formed, condensing said gases, and quantitatively measuring the same.

8. A method of determining the percentage of carbon in a metal which comprises oxidizing a sample, removing water from the gas so formed by cooling in carbon-dioxide snow, condensing said gas, and quantitatively measuring the same.

9. A method of determining the percentage of carbon in a metal which consists in oxidizing a sample, removing water from the gas so formed by cooling in carbon-dioxide snow, condensing said gas by liquid air, and quantitatively measuring the same with the aid of a manometer.

10. A method of determining the percentage of carbon in a metal which comprises oxidizing a sample to form gas, converting said gases to carbon dioxide, condensing, and quantitatively measuring the same.

11. A method of determining the percentage of carbon in a metal which comprises oxidizing a sample to form gases, converting said gases to carbon dioxide by passing same through a tube containing hot copper oxide, condensing the carbon dioxide, and quantitatively measuring the same.

12. A method of determining the percentage of carbon in a metal which comprises heating a sample in a receptacle, evacuating said receptacle, condensing the gas liberated, and quantitatively measuring the same.

13. A method of determining the percentage of carbon in a metal which comprises heating a sample to approximately 600° C. in a receptacle, evacuating said receptacle, passing the liberated gases over copper oxide heated to a temperature of approximately 400° C., condensing said gases, and quantitatively measuring the same.

14. A method of determining the percentage of carbon in a metal which comprises heating a sample in a receptacle, evacuating said receptacle, condensing the gas liberated, quantitatively measuring same, oxidizing said sample, condensing the gas formed, and quantitatively measuring the same.

15. A method of determining the percentage of carbon in a metal which comprises heating a sample to approximately 600° C. in a receptacle, evacuating said receptacle, passing the liberated gases over copper oxide heated to a temperature of approximately 400° C., condensing said gases, quantitatively measuring the same, oxidixing said sample at approximately 1000° C., passing the gases formed through copper oxide heated to about 400° C., condensing said gases, and quantitatively measuring the same.

16. A method of determining the percentage of carbon in a metal which comprises heating a sample to approximately 600° C. in a combustion tube, evacuating said tube, coverting the gases so liberated into carbon dioxide by passing same through a tube containing hot copper oxide, removing water therefrom by carbon-dioxide snow, condensing said gases, quantitatively measuring the same, oxidizing said sample at approximately 1000° C., passing the gases formed through hot copper oxide, condensing said gases, and quantitatively measuring the condensed gas by allowing it to vaporize in a confined space and measuring the resulting pressure.

17. A method of determining the percentage of volatilizable constituents of a substance which consists in heating a sample thereof, condensing the gas so formed, allowing the same to vaporize in a confined space, and measuring the resulting pressure.

18. An apparatus for determining the percentage of carbon in a metal comprising a combustion tube, means for heating same, means for condensing gases connected thereto, and means for measuring said gases.

19. An apparatus for determining the percentage of carbon in a substance comprising a combustion tube, means for heating same, a bulb cooled by liquid air for condensing gases connected thereto, and means for measuring said gases.

20. An apparatus for determining the percentage of carbon in a sample of material comprising a combustion tube, means for heating same, a bulb cooled by liquid air for condensing gases connected thereto, and a mercury manometer for measuring said gases.

21. An apparatus for determining the percentage of carbon in a metal comprising a combustion tube, means for heating same, means for condensing water connected thereto, means for condensing gases connected to said water-condensing means, and means for measuring said gases.

22. An apparatus for determining the percentage of carbon in a metal comprising a combustion tube, means for heating the same, a bulb cooled by carbon-dioxide snow for condensing water connected thereto, a bulb cooled by liquid air connected to said carbon-dioxide-snow bulb for condensing gases, and means for measuring said gases.

23. An apparatus for determining the percentage of carbon in a metal comprising a combustion tube, means for heating the same, means for condensing gases connected thereto, means for measuring said gases, and means for closing off said condensing and measuring means from the remainder of the apparatus.

24. An apparatus for determining the percentage of carbon in a metal comprising a combustion tube, means for heating same, means for condensing gases connected thereto, means for measuring said gases, and means for closing off said condensing and measuring means from the remainder of the apparatus comprising stop cocks in said apparatus, one being placed in front of said condensing means and another beyond said measuring means.

25. An apparatus for determining the percentage of carbon in a metal comprising a combustion tube, means for heating the same, a device for converting carbon monoxide to carbon dioxide connected thereto, means for condensing gases connected to said device, and means for measuring said gases.

26. An apparatus for determining the percentage of carbon in a metal comprising a combustion tube, means for heating the same, a tube containing copper oxide connected thereto and adapted to be heated, means for condensing gases connected to said copper oxide tube, and means for measuring said gases.

27. An apparatus for determining the percentage of carbon in a metal comprising a combustion tube, means for heating the same, means condensing gases connected thereto, means for measuring said gases, and means for evacuating said apparatus.

28. An apparatus for determining the percentage of carbon in a metal comprising a combustion tube, an oxygen supply connected to one end thereof, means for removing water and carbon-dioxide therefrom, means for heating said tube, means for condensing gases connected to the other end thereof, and means for measuring said gases.

29. An apparatus for determining the percentage of carbon in a metal comprising a relatively long combustion tube, a set of furnaces slidably mounted on said tube, one of which is adapted to heat the same to a temperature higher than the other, an oxygen supply connected to one end of said tube, means interposed between said supply and said tube for measuring oxygen and removing impurities therefrom, a tube containing copper oxide connected to the other end of said combustion tube, means for heating said copper oxide, a tube connected to said copper-oxide-containing tube, said latter tube being surrounded by carbon-dioxide snow and provided with an outlet, said outlet communicating with a tube surrounded by liquid air and provided with an outlet, means connected to said latter outlet for evacuating said system, control valves placed on either side of said last-named tube, and a pressure measuring device between said valves.

In testimony whereof, I have hereunto subscribed my name this 18th day of October, 1920.

TRYGVE D. YENSEN.